US011952926B2

(12) United States Patent
Smith et al.

(10) Patent No.: US 11,952,926 B2
(45) Date of Patent: Apr. 9, 2024

(54) ROTATING SEPARATOR WITH SINGLE ASSEMBLY ORIENTATION AND INTEGRATED COUNTERBALANCE

(71) Applicant: CUMMINS FILTRATION IP, INC., Columbus, IN (US)

(72) Inventors: Bradley A. Smith, Columbus, IN (US); Benjamin L. Scheckel, Stoughton, WI (US); Chirag D. Parikh, Madison, WI (US)

(73) Assignee: CUMMINS FILTRATION IP, INC., Columbus, IN (US)

( * ) Notice: Subject to any disclaimer, the term of this patent is extended or adjusted under 35 U.S.C. 154(b) by 437 days.

(21) Appl. No.: 17/283,861

(22) PCT Filed: Oct. 11, 2019

(86) PCT No.: PCT/US2019/055777
§ 371 (c)(1),
(2) Date: Apr. 8, 2021

(87) PCT Pub. No.: WO2020/077172
PCT Pub. Date: Apr. 16, 2020

(65) Prior Publication Data
US 2021/0381411 A1 Dec. 9, 2021

Related U.S. Application Data

(60) Provisional application No. 62/744,240, filed on Oct. 11, 2018.

(51) Int. Cl.
*B01D 46/00* (2022.01)
*B01D 33/11* (2006.01)
(Continued)

(52) U.S. Cl.
CPC .......... *F01M 13/04* (2013.01); *B01D 33/11* (2013.01); *B01D 35/30* (2013.01);
(Continued)

(58) Field of Classification Search
CPC ........ B01D 33/00; B01D 33/11; B01D 35/30; B01D 46/0004; B01D 46/0056; F01M 13/04
See application file for complete search history.

(56) References Cited

U.S. PATENT DOCUMENTS 5,683,342 A   11/1997 McNair
6,224,531 B1   5/2001 Frehland et al.
(Continued)

FOREIGN PATENT DOCUMENTS

CN   101908783 A   12/2010
CN   103518469 A   1/2014
(Continued)

OTHER PUBLICATIONS

International Search Report and Written Opinion issued for PCT Application No. PCT/US2019/055777, dated Dec. 27, 2019, 8 pages.
(Continued)

*Primary Examiner* — Robert A Hopkins
(74) *Attorney, Agent, or Firm* — Foley & Lardner LLP

(57) ABSTRACT

A rotating separator including a filter element extending axially along a longitudinal axis and including a first endplate, a second endplate, and a separating element. The first endplate includes a center tube. The second endplate is coupled to the first endplate and includes a central aperture having a perimeter and receiving the center tube. The filter element also includes an axially extending slot and an axially extending protrusion positioned on one of the first endplate and the second endplate and configured to engage
(Continued)

with each other. The first and second endplates form an interior cavity when coupled together. The rotating separator includes a filter structure positioned within the interior cavity.

21 Claims, 11 Drawing Sheets

(51) Int. Cl.
  *B01D 35/30* (2006.01)
  *B01D 46/26* (2006.01)
  *F01M 3/04* (2006.01)
  *F01M 13/04* (2006.01)

(52) U.S. Cl.
  CPC ....... *B01D 46/0004* (2013.01); *B01D 46/003* (2013.01); *B01D 46/0056* (2013.01); *B01D 46/26* (2013.01); *F01M 2013/0422* (2013.01); *F01M 2013/0438* (2013.01); *F01M 2013/0488* (2013.01)

(56) References Cited

U.S. PATENT DOCUMENTS

| | | |
|---|---|---|
| 6,551,230 B2 | 4/2003 | Herman et al. |
| 7,597,658 B2 | 10/2009 | Samways et al. |
| 2006/0258523 A1 | 11/2006 | Samways et al. |
| 2009/0050121 A1 | 2/2009 | Holzmann et al. |
| 2012/0018359 A1 | 1/2012 | Sann et al. |

FOREIGN PATENT DOCUMENTS

| | | | |
|---|---|---|---|
| CN | 103842048 A | | 6/2014 |
| CN | 206897647 U | | 1/2018 |
| JP | H09503431 A | * | 4/1997 |

OTHER PUBLICATIONS

First Office Action issued for Chinese Patent Application No. CN 201980064805.3 dated May 23, 2022, 9 pages.

* cited by examiner

ROTATING SEPARATOR WITH SINGLE ASSEMBLY ORIENTATION AND INTEGRATED COUNTERBALANCE

CROSS-REFERENCE TO RELATED APPLICATIONS

This application is a National Phase of PCT Application No. PCT/US2019/055777, filed Oct. 11, 2019, claims priority to and the benefit of U.S. Provisional Patent Application No. 62/744,240, filed on Oct. 11, 2018. The contents of these applications are hereby incorporated by reference in their entirety.

TECHNICAL FIELD

The present invention relates generally to rotating separators for filtering fluids in internal combustion engine systems.

BACKGROUND

During operation of an internal combustion engine, a fraction of combustion gases, called blowby gases, can flow out of the combustion cylinder and into the crankcase of the engine. The blowby gases can include a mixture of aerosols, oils, and air. The blowby gases are typically routed out of the crankcase via a crankcase ventilation system. The crankcase ventilation system may pass the blowby gases through a rotating separator to remove a majority of the aerosols and oils contained in the blowby gases. The filtered blowby gases are then either vented to the ambient (in open crankcase ventilation systems) or routed back to the air intake for the internal combustion engine for further combustion (in closed crankcase ventilation systems). In rotating separators, the contaminants (e.g., oil droplets suspended and transported by blowby gases) are separated at least in part by centrifugal separation techniques.

Rotating separators include a separating element that can include filter structure such as filter media, stacks of separating cones, stacks of separating discs, or combinations thereof. Conventional rotating separator endplates can be assembled in multiple orientations. These different orientations can cause a significant amount of variation in imbalance conditions for the conventional rotating separator.

SUMMARY

Various example embodiments relate to a rotating separator including a filter element extending axially along a longitudinal axis and having a first endplate, a second endplate, and a separating element. The first endplate includes a center tube. The second endplate is coupled to the first endplate and includes a central aperture having a perimeter and receiving the center tube. The filter element also includes an axially extending slot and an axially extending protrusion positioned on one of the first endplate and the second endplate. The axially extending protrusion is configured to engage with the axially extending slot. The first and second endplate form an interior cavity when coupled together. The rotating separator includes filter structure positioned within the interior cavity.

Other example embodiments relate to a filter element extending axially along a longitudinal axis and having a first endplate and a second endplate. The first endplate includes a center tube. The second endplate is coupled to the first endplate and includes a central aperture having a perimeter and receiving the center tube. The filter element also includes an axially extending slot and an axially extending protrusion positioned on one of the first endplate and the second endplate. The axially extending protrusion is configured to engage with the axially extending slot.

Other example embodiments relate to a rotating separator including a filter element extending axially along a longitudinal axis and having a first endplate, a second endplate, and filter structure. The rotating separator also includes a central hub. The first endplate includes a first central aperture. The second endplate is coupled to the first endplate forming an interior cavity therein and includes a second central aperture. The central hub is positioned axially between and coupled to the first endplate and the second endplate. The central hub includes a center tube extending along the longitudinal axis. The filter element further includes a first axially extending slot and a second axially extending slot. The filter element further includes a first protrusion and a second protrusion. The first and second protrusions and the first and second slots are positioned on one of the first endplate, the second endplate, and the central tube in some combination thereof. The first and second protrusions are configured to engage with the first and second axially extending slots, respectively. Filter structure is positioned within the interior cavity and configured to filter a contaminate from a fluid.

With various embodiments discussed herein, the effects of part-to-part variation can be minimized by limiting the assembly of the rotating separator to a single orientation. This results in greater consistency in the location and amount of the out of balance mass such that the need for performing element balancing can be drastically reduced or even eliminated.

These and other features, together with the organization and manner of operation thereof, will become apparent from the following detailed description when taken in conjunction with the accompanying drawings, wherein like elements have like numerals throughout the several drawings described below.

DETAILED DESCRIPTION

Referring to the figures generally, a rotating separator configured to filter fluid exiting a crankcase is shown. The rotating separator includes a filter element formed by first and second endplates operatively coupled together. The first and second endplates include a slot (or aperture) and protrusion (or key) arrangement configured to mate together such that the first and second endplates can be coupled together in a single orientation. Additional material can be included or removed on each one of the endplates to counterbalance the key or slot. In another embodiment, the rotating separator includes a central hub, a first endplate, and a second endplate, with two keys formed on the central hub and each endplate having a slot configured to mate with each key. Additional material can be included or removed on the central hub or endplates to counterbalance the keys or slots. Fluid entering the filter element is filtered by filter structure (e.g., fibrous or nonfibrous media, axially wrapped media, stacks of separating cones, stacks of separating discs, etc.) housed therein.

Figure 1:
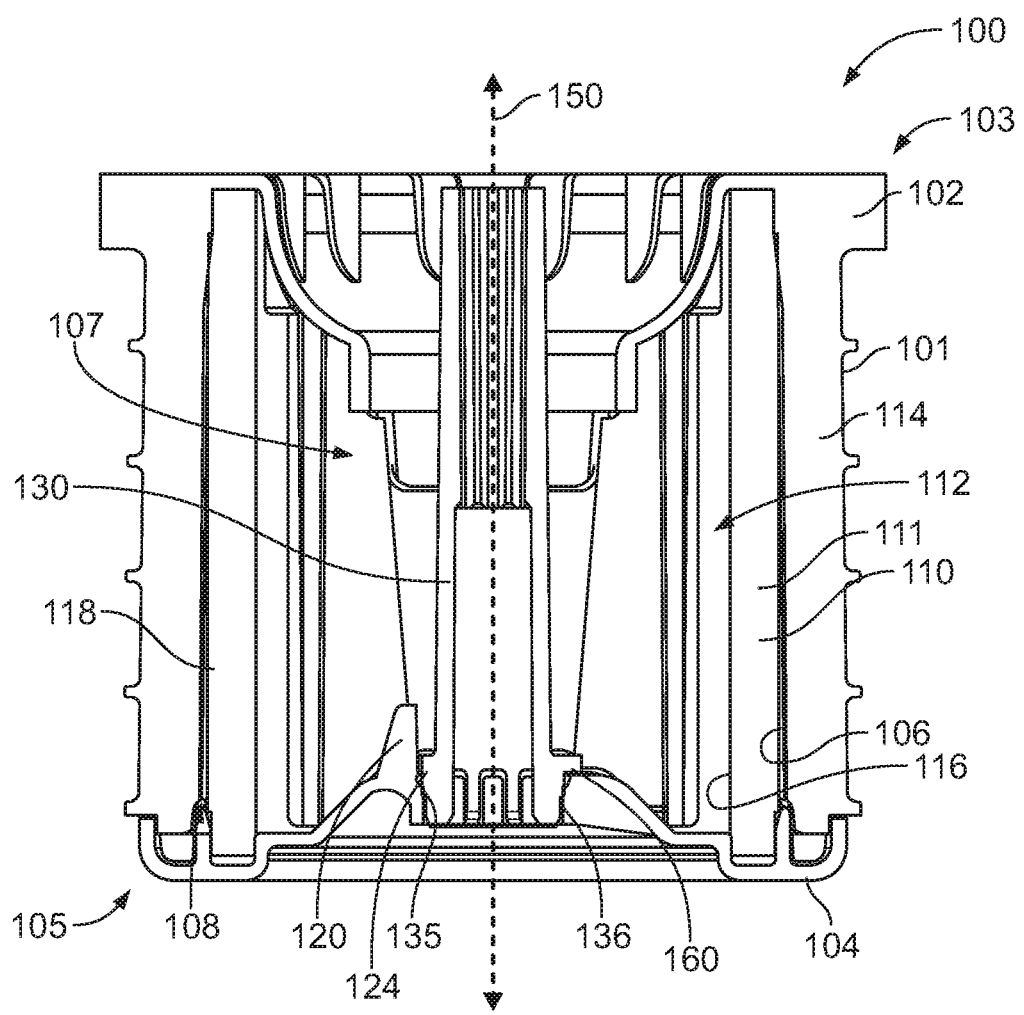
FIG. 1 shows a cross-sectional view of a rotating separator, according to an example embodiment.
Figure 2:
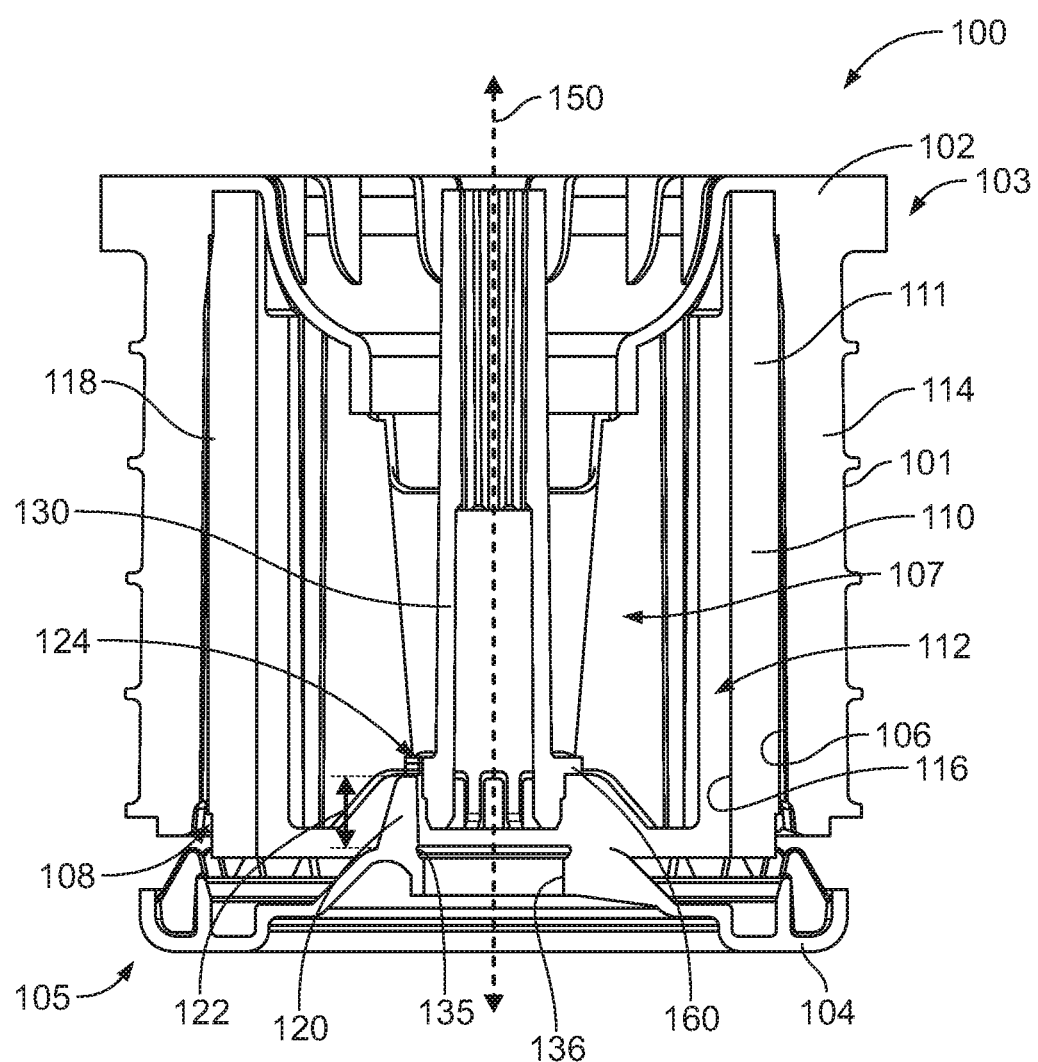
FIG. 2 shows a cross-sectional view of the rotating separator of FIG. 1 prior to final assembly.
Figure 3:
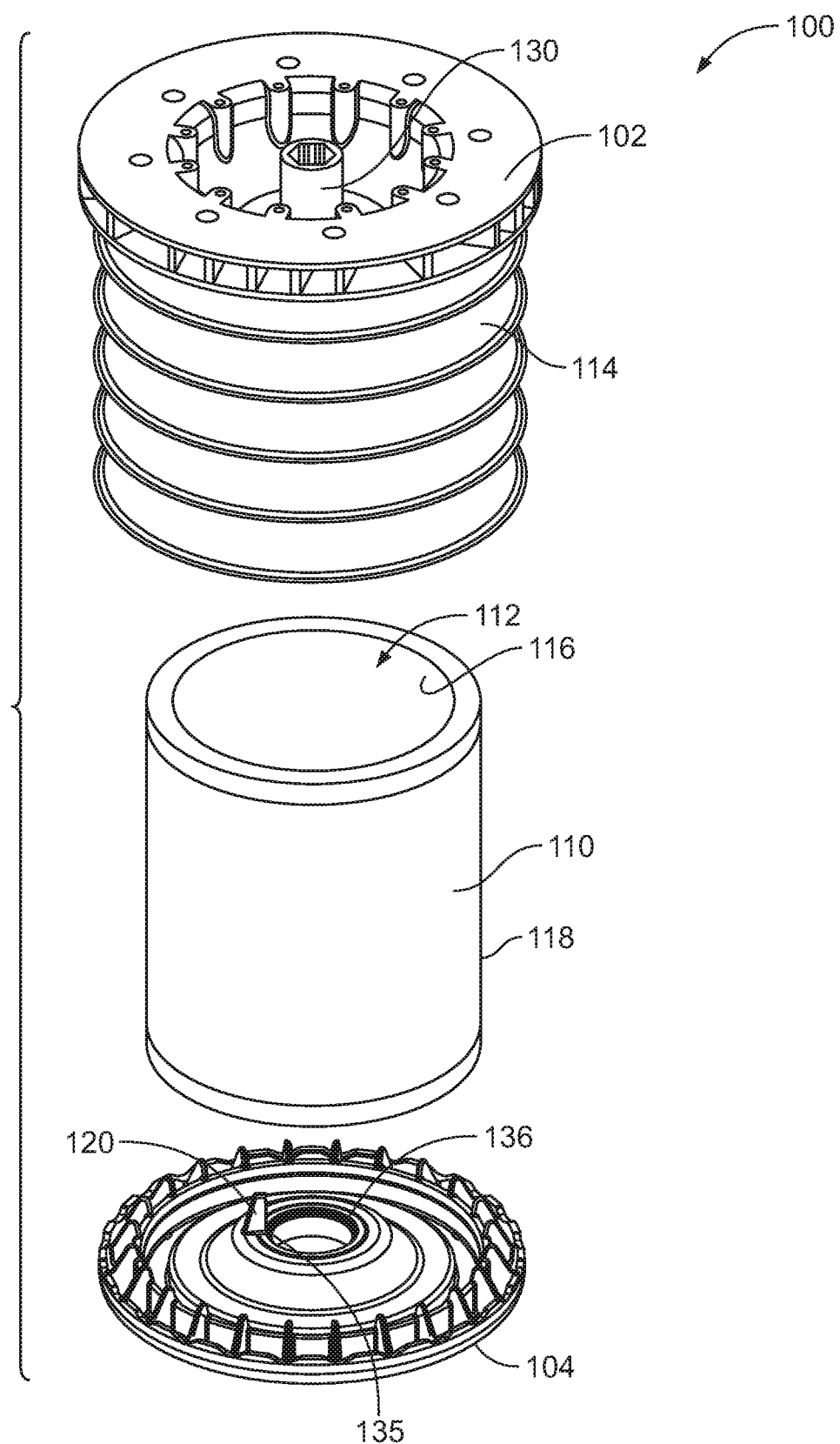
FIG. 3 shows an exploded view of the rotating separator of FIG. 1.

Referring to FIGS. 1-3, a rotating separator 100 is shown according to an example embodiment. The rotating separator 100 includes a filter element 101 having a longitudinal axis 150. The filter element 101 includes a first endplate 102 and a second endplate 104 coupled together, with an internal cavity 107 defined between the first endplate 102 and the second endplate 104. The rotating separator 100 is a separating element configured to filter a contaminate from fluid flowing therethrough.

The rotating separator 100 includes filter structure 111 disposed in the filter element 101 and extending along the longitudinal axis 150 between a first axial end 103 and a second axial end 105. The filter structure 111 is arranged in a cylindrical manner with an interior surface 116 defining a hollow interior 112 and an exterior surface 118 defining an exterior channel 108 (e.g., defined between the exterior surface 118 of the filter structure 111 and an interior surface 106 of the filter element 101). The filter structure 111 is positioned between the first endplate 102 and the second endplate 104 in a radial interference fit. In other embodiments, the filter structure 111 is potted or embedded with the first endplate 102 on one axial end and potted or embedded with the second endplate 104 at the opposite axial end. In other embodiments, the filter structure 111 is positioned and held between the first endplate 102 and the second endplate 104 using other techniques. The filter structure 111 can include various types of structures, including, but not limited to, axially wrapped media, fibrous and nonfibrous media, stacks of separating cones, stacks of separating discs, and combinations thereof.

Fluid entering the rotating separator 100 flows inside-out, radially outwardly from the hollow interior 112, through the filter structure 111, and into the exterior channel 108. In the case of blowby gas flowing through the rotating separator 100, centrifugal force drives oil radially outwardly from interior surface 116 to exterior surface 118. The separated oil can then be drained back into the crankcase of an engine.

The first endplate 102 includes a sidewall 114 extending along the longitudinal axis 150 from the first axial end 103 of the filter element 101 to a second axial end 105 of the filter element 101. The sidewall 114 is cylindrical in shape and is configured to couple to the second endplate 104 at the second axial end 105 of the filter element 101. The first endplate 102 also includes a center tube 130 extending along the longitudinal axis 150 from the first axial end 103 to the second axial end 105 of the filter element 101. The rotating separator 100 may be rotated and driven by a mechanical coupling (e.g., via center tube 130, via an insert in the center tube 130) to a component of the engine, e.g., axially extending shaft connected to a gear or drive pulley of the engine. In other embodiments, the rotating separator 100 may be mechanically coupled to a shaft, which is driven by an electric motor or a hydraulically-driven turbine.

As shown in FIG. 2, an axially extending slot or aperture 124 is formed on the center tube 130 of the first endplate 102. The slot 124 mates with (e.g., receives) an axially extending protrusion or key 120 formed on the second endplate 104 when the first endplate 102 and the second endplate 104 are coupled together as described further herein. In another embodiment, the axially extending slot of aperture 124 is formed on the first endplate 102, but not on the center tube 130. In other embodiments, the axially extending slot or aperture 124 is formed on the second endplate 104.

Figure 4:
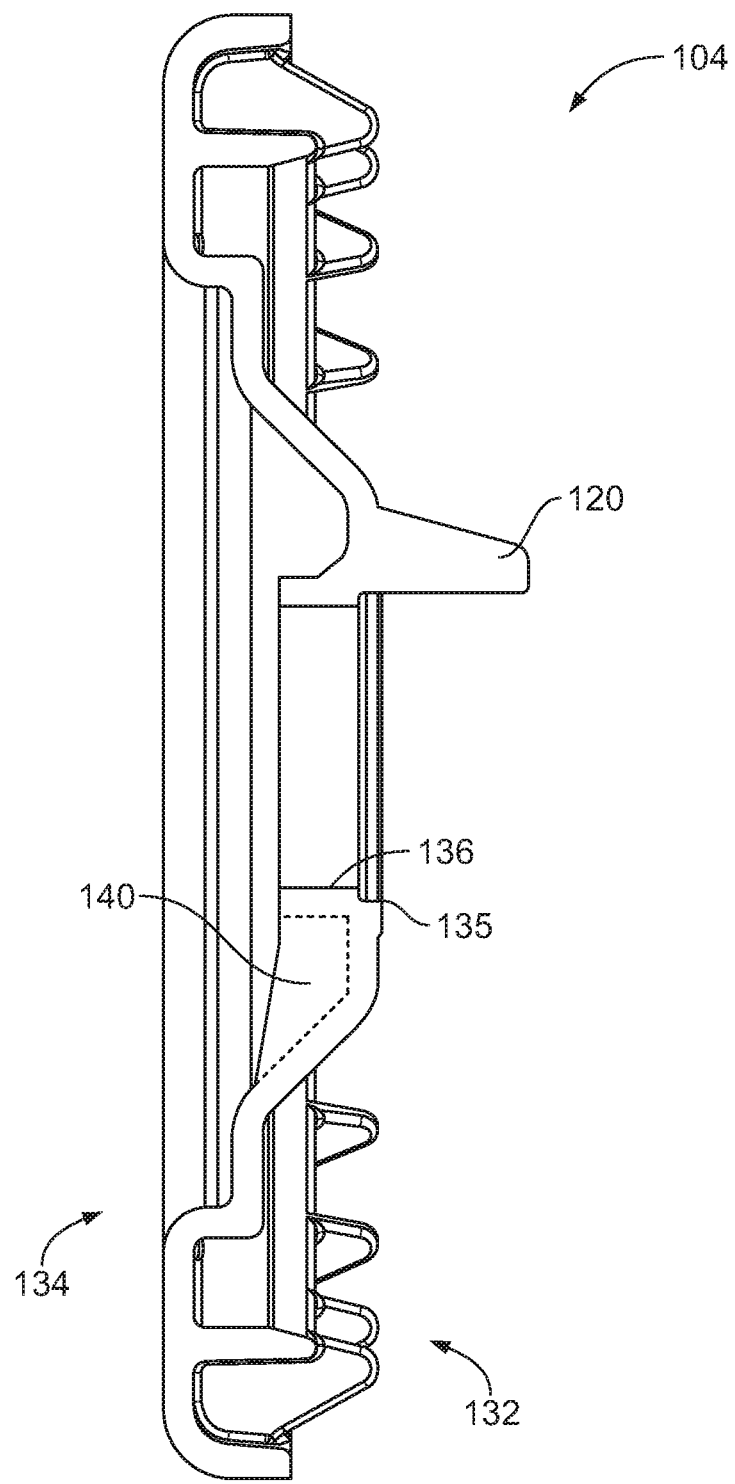
FIG. 4 shows a cross-sectional view of the bottom endplate of the rotating separator of FIG. 1.
Figure 5:
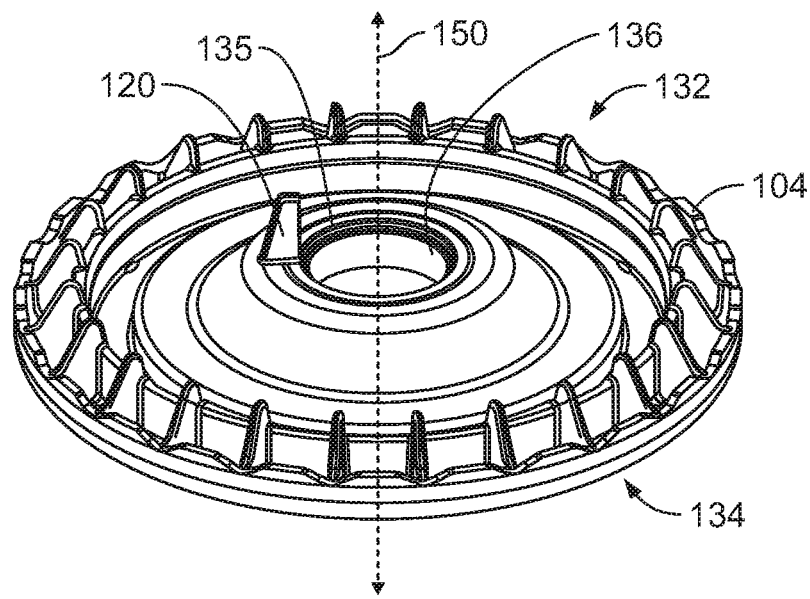
FIG. 5 shows a top perspective view of the bottom endplate of the rotating separator of FIG. 1.
Figure 6:
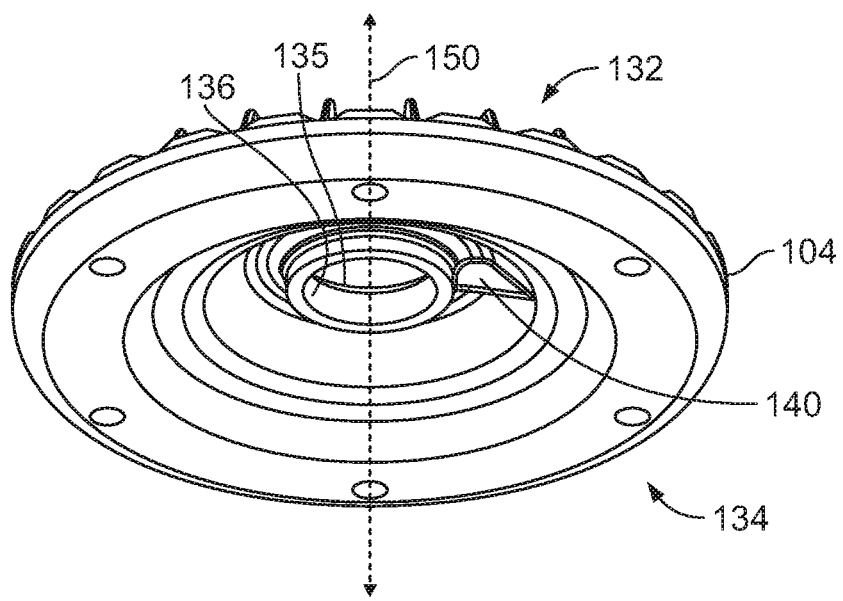
FIG. 6 shows a bottom perspective view of the bottom endplate of the rotating separator of FIG. 1.

Referring to FIGS. 4-6, the second endplate 104 includes a second endplate interior side 132 and a second endplate exterior side 134. When assembled with the first endplate 102 to form the filter element 101 as shown in FIGS. 1-2, the second endplate interior side 132 faces the internal cavity 107 formed therein and the second endplate exterior side 134 faces outside the filter element 101. The second endplate 104 also includes a central aperture 136 extending therethrough and having a perimeter 135. The central aperture 136 receives the center tube 130 of the first endplate 102 when the first and second endplates 102, 104 are assembled together (shown in FIG. 1).

The second endplate 104 includes a protrusion or key 120 formed on the second endplate interior side 132 proximate (e.g., adjacent to) the perimeter 135 of the central aperture 136. As shown in FIG. 2, the key 120 extends a distance 122 from the second axial end 105 to the first axial end 103 of the filter element 101. As shown in FIG. 2, during assembly, if the filter structure 111 is pre-assembled to the first endplate 102, the distance 122 the key 120 extends prevents the filter structure 111 from engaging the second endplate 104 until the key 120 of the second endplate 104 has engaged the slot 124 of the first endplate 102. This configuration allows the operator to rotate the endplates 102, 104 easily in an effort to find the correct alignment and engage the key 120 with the slot 124 to align the first and second endplates 102, 104. In another embodiment, the protrusion or key 120 is formed on the second endplate 104, but not proximate the perimeter 135 of the central aperture 136. In other embodiments, the protrusion or key 120 is formed on the first endplate 102.

Still referring to FIGS. 4-6, the second endplate 104 also includes a counterbalance mass 140 formed on the second endplate exterior side 134 proximate the central aperture 136. The counterbalance mass 140 is positioned on an opposite side of the longitudinal axis 150 from the key 120 (e.g., 180 degrees from to the positioning of the key 120 along the perimeter 135 of the central aperture 136). The counterbalance mass 140 is positioned in such a way as to counterbalance the effect of the mass of the key 120 during rotation of the rotating separator 100. Accordingly, the counterbalance mass 140 may be substantially the same mass as the key 120 so to balance the key 120 during rotation. In other embodiments, the counterbalance mass 140 can be otherwise formed on the first endplate 102 or the second endplate 104.

Figure 7:
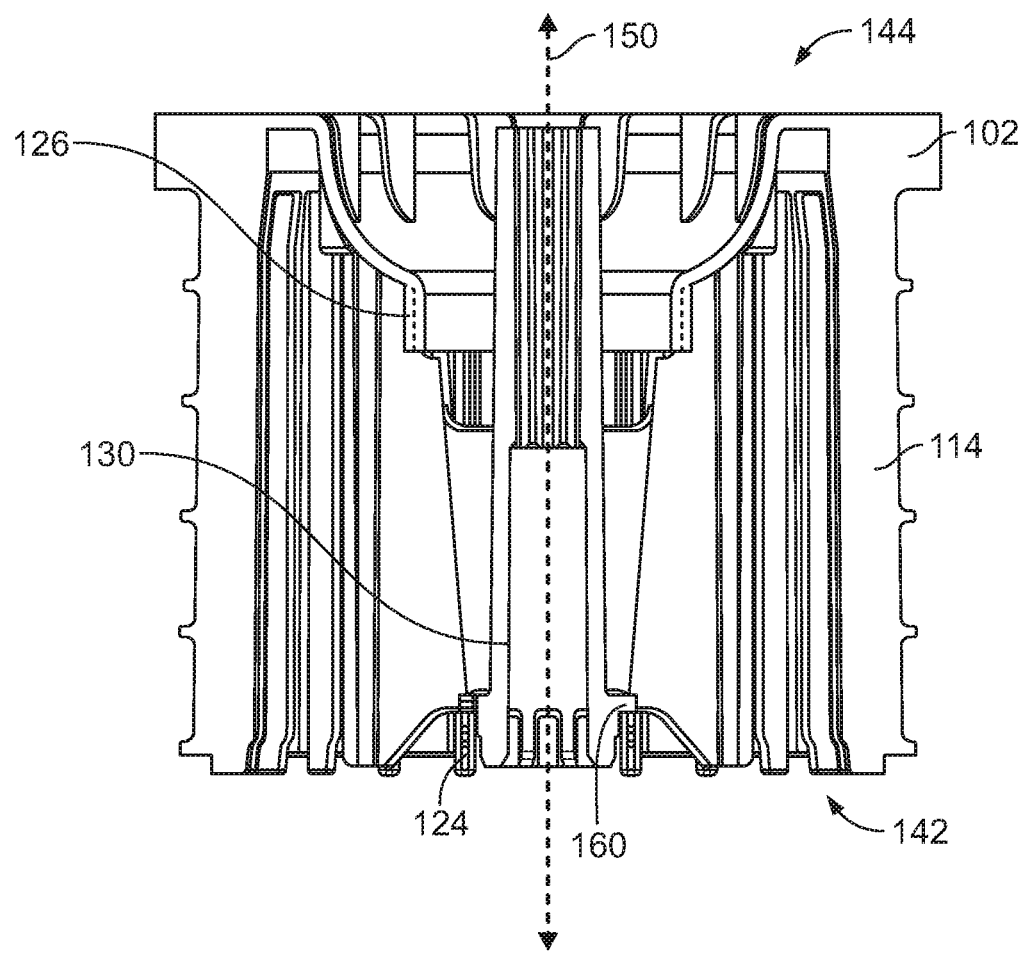
FIG. 7 shows a cross-sectional view of the top endplate of the rotating separator of FIG. 1.
Figure 8:
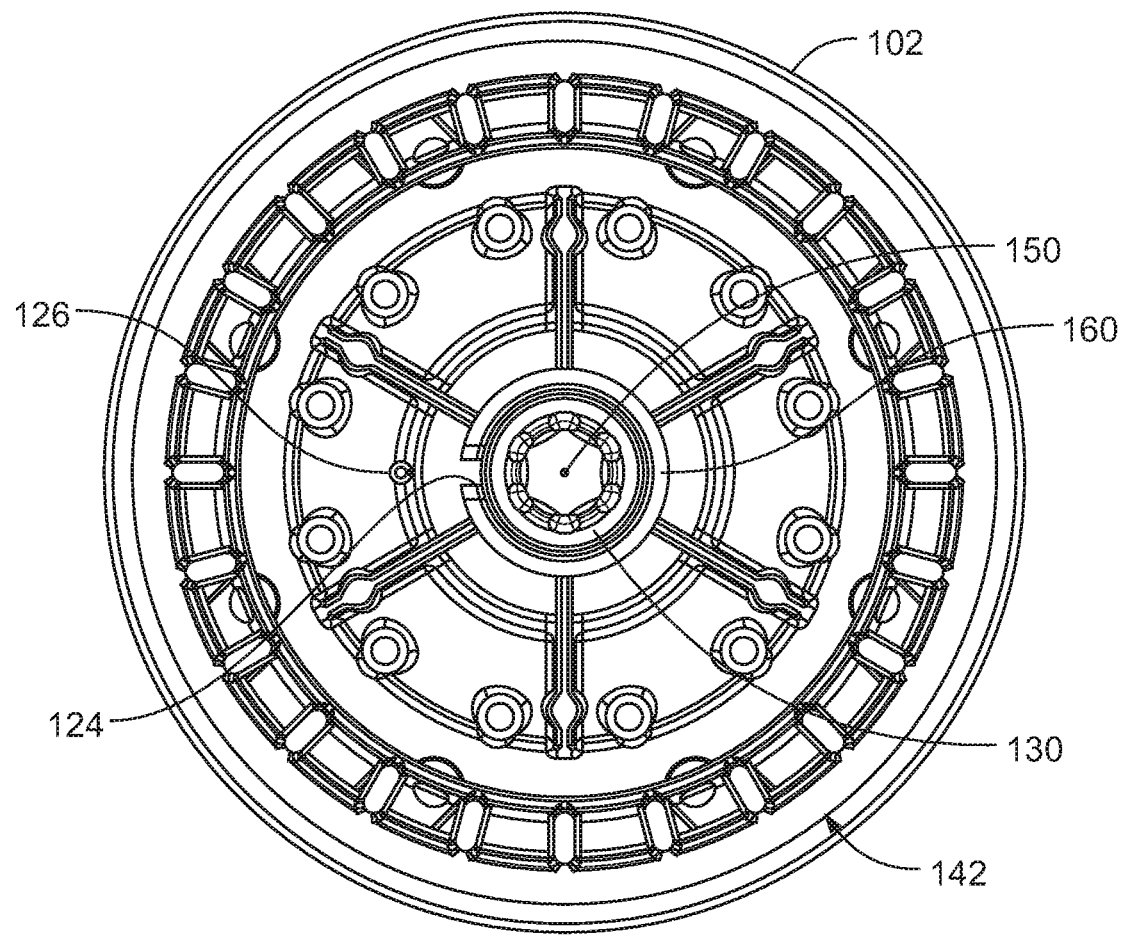
FIG. 8 shows a bottom view of the top endplate of the rotating separator of FIG. 1.
Figure 9:
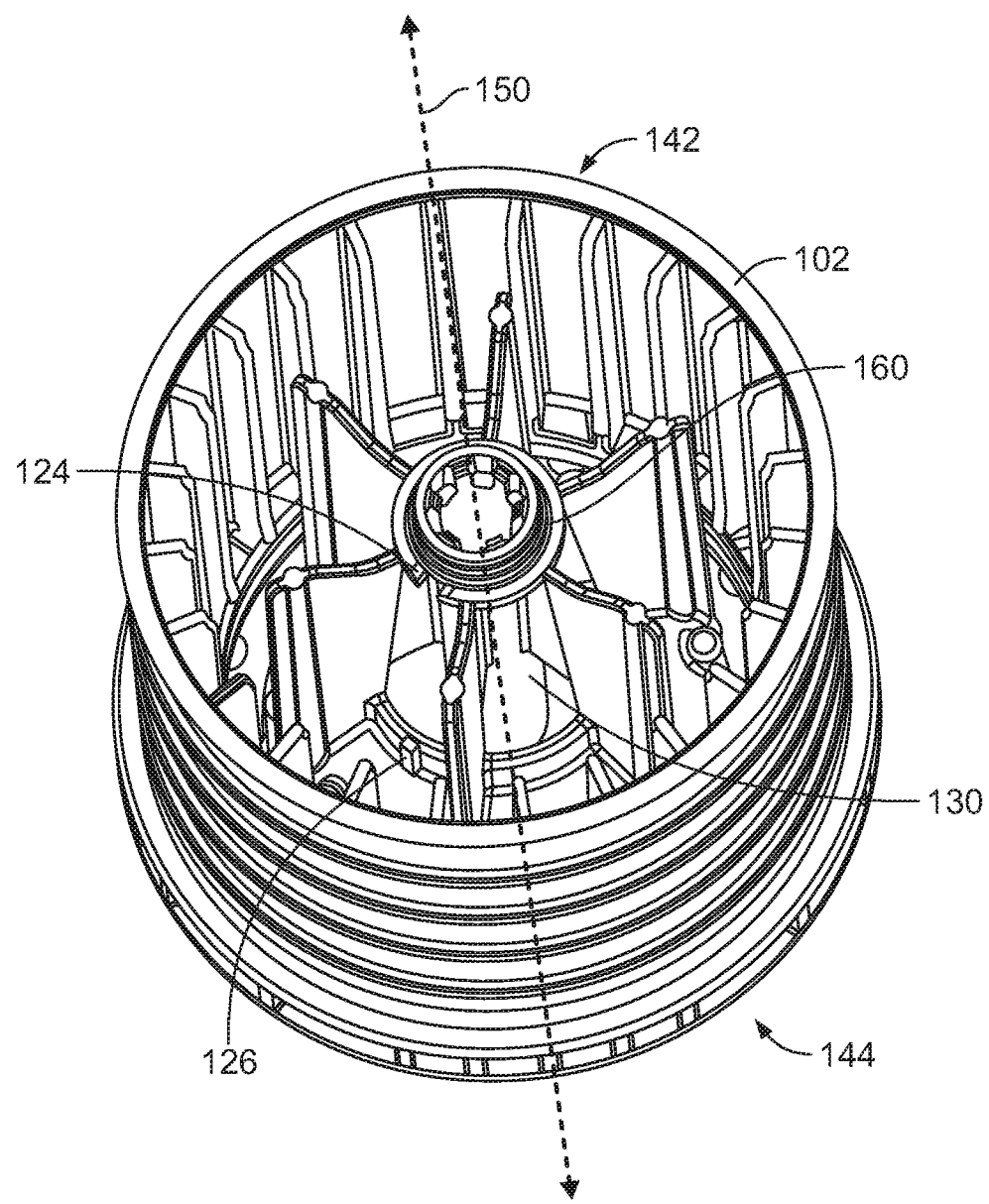
FIG. 9 shows a bottom perspective view of the top endplate of the rotating separator of FIG. 1.

Referring to FIGS. 7-9, the first endplate 102 includes a first endplate interior side 142 and a first endplate exterior side 144. When assembled with the second endplate 104 to form the filter element 101 as shown in FIGS. 1-2, the first endplate interior side 142 faces the internal cavity 107 formed therein and the first endplate exterior side 144 faces outside the filter element 101. The first endplate 102 also includes a planar ring 160 (e.g., flange) formed on the center tube 130. The planar ring 160 abuts the second endplate interior side 132 when the first and second endplates 102, 104 are assembled together (shown in FIG. 1).

The first endplate 102 also includes a slot 124 formed on the planar ring 160 of the center tube 130 proximate the longitudinal axis 150. The slot 124 is configured to receive and mate with the key 120 of the second endplate 104 when the first and second endplates 102, 104 are assembled together (shown in FIG. 1). When assembling the first and second endplates 102, 104, the surface of the planar ring 160 allows the key 120 to slide across the planar ring 160 easily while rotating the endplates 102, 104 about the longitudinal axis 150 until the key 120 slides into the slot 124. In another embodiment, the slot 124 is formed on the first endplate 102, but not on the planar ring 160 of the center tube 130. In other embodiments, the slot 124 is formed on the second endplate 104.

Still referring to FIGS. 7-9, the first endplate 102 also includes a counterbalance mass 126 formed on the first endplate interior side 142 proximate the center tube 130. As shown in FIG. 8, the counterbalance mass 126 is positioned axially in line with the slot 124 (e.g., along the same angle about the longitudinal axis 150). The counterbalance mass 126 is positioned in such a way as to counterbalance the effect of the slot 124 (e.g., the missing mass about the planar ring 160) during rotation of the rotating separator 100. The additional mass of the counterbalance mass 126 acts to substitute the mass missing from the planar ring 160 (e.g., where the slot 124 is positioned). Accordingly, the counterbalance mass 140 may be substantially the same mass as the missing portion of the planar ring 160 due to the slot 124 so as to balance the rotating separator 100 during rotation. In other embodiments, the counterbalance mass 126 can be otherwise formed on the first endplate 102 or the second endplate 104. In some embodiments, the first endplate 102 and the second endplate 104 are ultrasonically welded together. In some embodiments, the first endplate 102 and the second endplate 104 are fastened together using fasteners, such as screws, etc.

Referring to FIGS. 10-13, a rotating separator 200 is shown according to another example embodiment. The rotating separator 200 includes a filter element 201 having a longitudinal axis 250. The filter element 201 includes a first endplate 202, a second endplate 204, and a central hub 230 coupled together and an internal cavity 207 formed therein.

The rotating separator 100 includes filter structure 111 disposed in the filter element 201 and extending along the longitudinal axis 250 between a first axial end 203 and a second axial end 205. The filter structure 211 is arranged in a cylindrical manner with an interior surface 216 defining a hollow interior 212 and an exterior surface 218 defining an exterior channel 208 (e.g., defined between the exterior surface 218 of the filter structure 211 and an interior surface 206 of the filter element 201). The filter structure 211 is positioned between the first endplate 202 and the second endplate 204 in a radial interference fit. In other embodiments, the filter structure 211 is potted or embedded with the first endplate 202 on one axial end and potted or embedded with the second endplate 204 at the opposite axial end. In other embodiments, the filter structure 211 is positioned and held between the first endplate 202 and the second endplate 204 using other techniques. The filter structure 211 can include various types of filtration media. Accordingly, in other embodiments, the filter structure 211 can also include stacks of separating cones, stacks of separating discs, a combination thereof, etc.

Fluid entering the rotating separator 200 flows inside-out, radially outwardly from the hollow interior 212, through the filter structure 211, and into the exterior channel 208. In the case of blowby gas flowing through the rotating separator 200, centrifugal force drives oil radially outwardly from interior surface 216 to exterior surface 218. The separated oil can then be drained back into the crankcase of an engine.

The first endplate 202 includes a sidewall 214 extending along the longitudinal axis 250 from the first axial end 203 of the filter element 201 to a second axial end 205 of the filter element 201. The sidewall 214 is cylindrical in shape and is configured to couple to the second endplate 204 at the second axial end 205 of the filter element 201. The first endplate 202 includes a first endplate interior side 242 and a first endplate exterior side 244. When assembled with the second endplate 204 and central hub 230, the first endplate interior side 242 faces the internal cavity 207 formed therein and the first endplate exterior side 244 faces outside the filter element 201. The first endplate 202 also includes a first central aperture 246 extending therethrough and having a first perimeter 245. The first central aperture 246 receives the center tube 231 of the central hub 230 when the first endplate 202, central hub 230, and second endplate 204 are assembled together.

The first endplate 202 also includes a first axially extending slot 224 formed on the first endplate interior side 242 proximate (e.g., adjacent to) the first central aperture 246. The first slot 224 extends from the first endplate interior side 242 longitudinally toward the first axial end 203 of the filter element 201. The first slot 224 is configured to receive and mate with the first key 221 of the central hub 230 when the first endplate 202, central hub 230, and second endplate 204 are coupled together as described further herein. In another embodiment, the first axially extending slot 224 is formed on the first endplate 202, but not proximate the first central aperture 246. In other embodiments, the first axially extending slot 224 is formed on the second endplate 204. In other embodiments, the first axially extending slot 224 is formed on the central hub 230.

The second endplate 204 includes a second endplate interior side 232 and a second endplate exterior side 234. When assembled with the first endplate 202 and central hub 230 to form the filter element 201, the second endplate interior side 232 faces the internal cavity 207 formed therein and the second endplate exterior side 234 faces outside the filter element 201. The second endplate 204 also includes a second central aperture 236 extending therethrough and having a second perimeter 235. The second central aperture 236 receives the center tube 231 of the central hub 230 when the first endplate 202, central hub 230, and second endplate 204 are assembled together.

The second endplate 204 also includes a second axially extending slot 226 formed on the second endplate interior side 232 proximate (e.g., adjacent to) the second central aperture 236. The second slot 226 extends from the second endplate interior side 232 longitudinally toward the second axial end 205 of the filter element 201. The second slot 226 is configured to receive and mate with the second key 220 of the central hub 230 when the first endplate 202, central hub 230, and second endplate 204 are coupled together. In another embodiment, the second slot 226 is formed on the second endplate 204, but not proximate the second central aperture 236. In other embodiments, the second slot 226 is formed on the first endplate 202. In still other embodiments, the second slot 226 is formed on the central hub 230.

Figure 10:
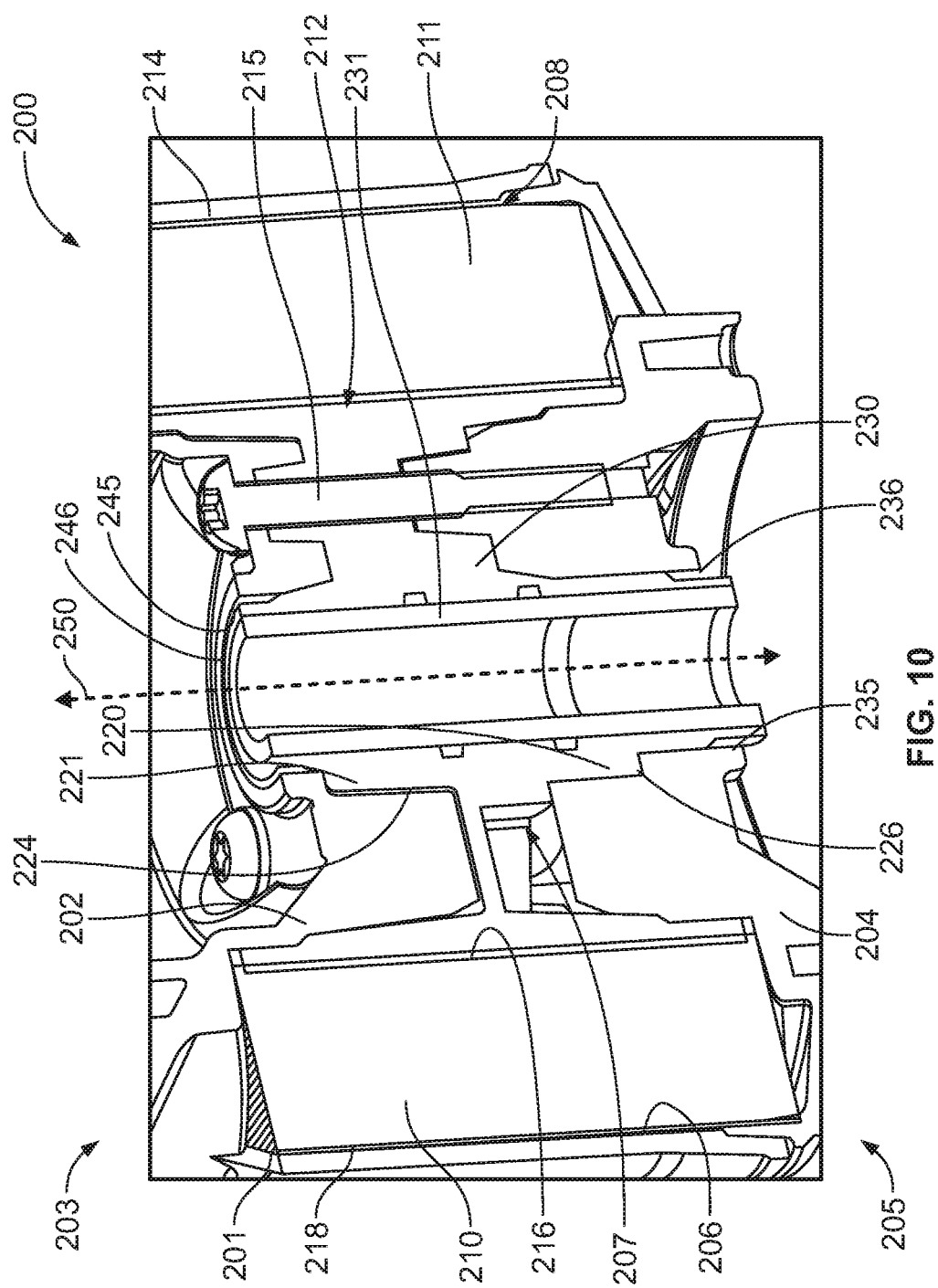
FIG. 10 shows a perspective cross-sectional view of a rotating separator, according to an example embodiment.

The central hub 230 is positioned axially between the first endplate 202 and the second endplate 204. The first endplate 202, the second endplate 204, and the central hub 230 can be fastened together using fasteners 215 as shown in FIG. 10. In other embodiments, the first endplate 202, second endplate 204, and the central hub 230 can be ultrasonically welded together. The central hub 230 includes a center tube 231 extending along the longitudinal axis 250 of the filter element 201. The central hub 230 includes a first protrusion or key 221 and a second protrusion or key 220 formed along the center tube 231 on each axial side of the central hub 230 (e.g., first key 221 faces the first endplate 202, second key 220 faces the second endplate 204). The first key 221 is configured to mate with and be received by the first slot 224 formed on the first endplate 202. The second key 220 is configured to mate with and be received by the second slot 226 formed on the second endplate 204. In another embodiment, the first key 221 and the second key 220 are formed on the central hub 230, but not on the center tube 231. In other embodiments, the first key 221 and the second key 220 are formed on the first endplate 202. In yet other embodiments, the first key 221 and the second key 220 are formed on the second endplate 204.

Figure 11:
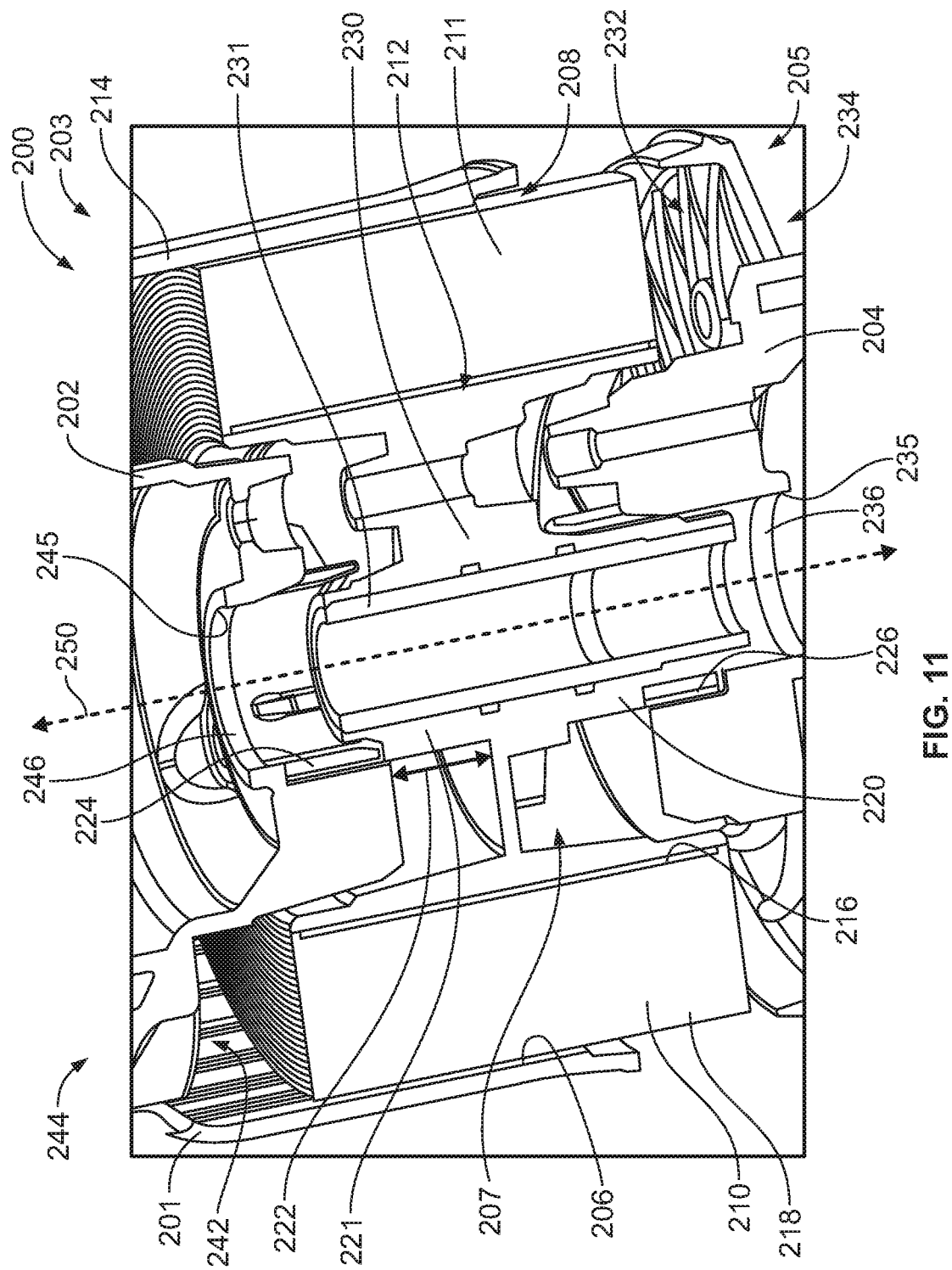
FIG. 11 shows a cross-sectional view of the rotating separator of FIG. 10 prior to final assembly.
Figure 12:
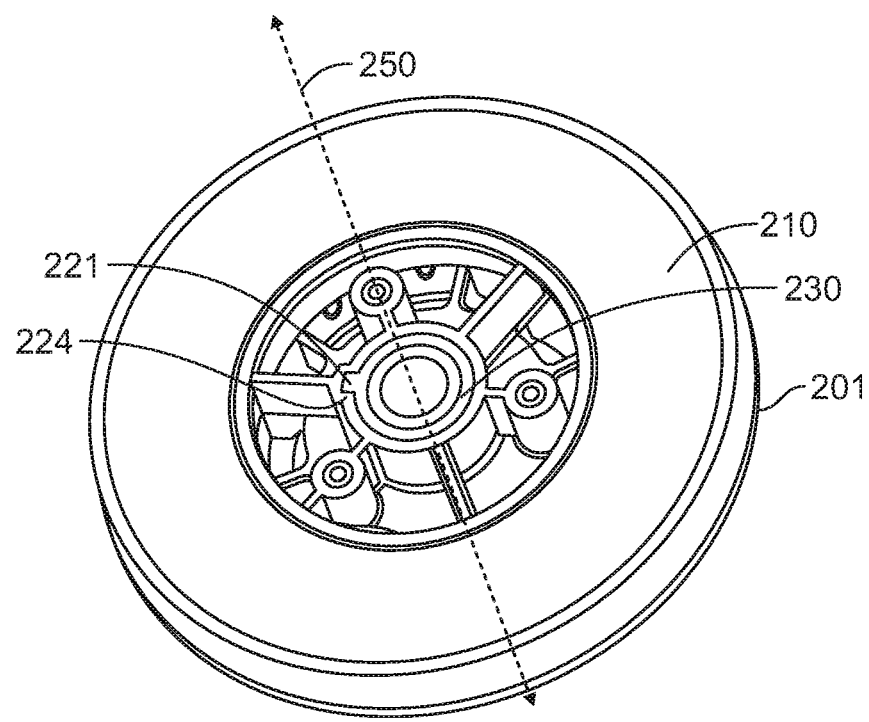
FIG. 12 shows a cross-sectional view of the central hub of the rotating separator of FIG. 10.
Figure 13:
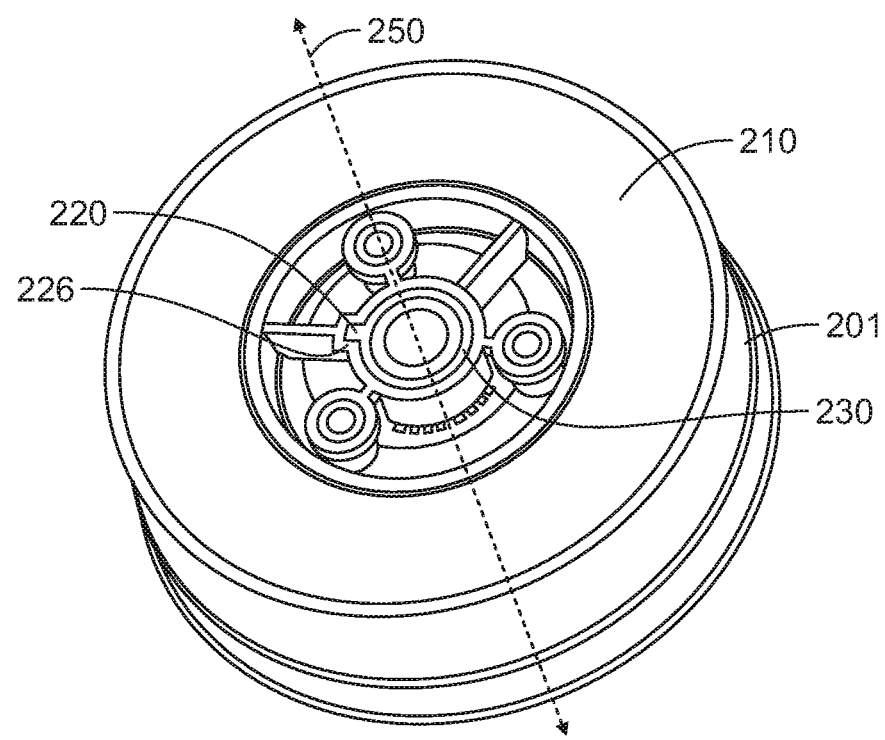
FIG. 13 shows a cross-sectional view of the central hub of the rotating separator of FIG. 10.

As shown in FIG. 11, the first key 221 and the second key 220 extend a distance 222 along the center tube 231 such that during assembly, if the filter structure 211 is preassembled to the first endplate 202, the distance 222 the first key 221 and the second key 220 extend prevents the filter structure 211 from engaging the second endplate 204 until the first key 221 and the second key 220 are engaged with the first slot 224 and the second slot 226, respectively, of the first endplate 202 and the second endplate 204. This configuration allows the operator to rotate the first endplate 202 and the second endplate 204 easily in an effort to find the correct alignment and engage the first key 221 and the second key 220 with the first slot 224 and the second slot 226, respectively to align the first endplate 202 and the second endplate 204.

The rotating separator 200 shown in FIGS. 10-13 also includes counterbalance masses on either the central hub 230 or the first endplate 202 and the second endplate 204. The counterbalance masses are positioned in such a way as to counterbalance the effect of the slots and keys (e.g., the missing mass due to a slot, the mass of a key) during rotation of the rotating separator 200. The additional mass of the counterbalance masses acts to either substitute the mass missing due to the inclusion of a slot or to counterbalance mass due to inclusion of a key. Accordingly, each counterbalance mass may be substantially the same mass as the missing portion of mass due to a slot and be positioned in line with the slot or may be substantially the same mass as a key and be positioned opposite the longitudinal axis 250 from the key. In this way, the counterbalance masses act to balance the rotating separator 200 during rotation.

In another embodiment, instead of including counterbalance masses, the first slot 224 and the first key 221 are positioned 180 degrees from the second slot 226 and the second key 220. In this way, the first endplate 202 and the second endplate 204 are oriented oppositely (e.g., 180 degrees) from each other to create a counterbalancing condition. In another embodiment, instead of incorporating the first key 221 and the second key 220 on the central hub 230 and the first slot 224 and the second slot 226 on the first endplate 202 and the second endplate 204, respectively, the first key 221 and the second key 220 can be positioned on the first endplate 202 and the second endplate 204, respectively, and the first slot 224 and the second slot 226 can be positioned on the central hub 230.

References herein to the positions of elements (e.g., "top," "bottom," "above," "below," etc.) are merely used to describe the orientation of various elements in the Figures. It should be noted that the orientation of various elements may differ according to other example embodiments, and that such variations are intended to be encompassed by the present disclosure. Further, the formation of a passage by one or more surfaces can comprise a wide variety of passage cross-sectional shapes, for example, passages having circular, rectangular, oval, etc. cross-sectional shapes.

As utilized herein, the term "substantially" and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed (e.g., within plus or minus five percent of a given angle or other value) are considered to be within the scope of the invention as recited in the appended claims.

The terms "coupled" and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various example embodiments are illustrative only. Although only a few embodiments have been described in detail in this disclosure, those skilled in the art who review this disclosure will readily appreciate that many modifications to the flow structures are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Additionally, features from particular embodiments may be combined with features from other embodiments as would be understood by one of ordinary skill in the art. Other substitutions, modifications, changes and omissions may also be made in the design, operating conditions and arrangement of the various example embodiments without departing from the scope of the present invention.

What is claimed is:

1. A rotating separator comprising:
a filter element extending axially along a longitudinal axis and comprising:
a first endplate including a center tube;
a second endplate coupled to the first endplate and including a central aperture having a perimeter, a second endplate interior side facing the interior cavity, a second endplate exterior side facing the filter assembly, and a first counterbalance mass formed on the second endplate exterior side, the first endplate and the second endplate forming an interior cavity between the first endplate and the second endplate;
an axially extending slot formed on one of the first endplate and the second endplate; and
an axially extending protrusion formed on one of the first endplate and the second endplate, the axially extending protrusion configured to engage with the axially extending slot; and
a filter structure positioned within the interior cavity and configured to filter a contaminate from a fluid.

2. The rotating separator of claim 1, further comprising a second counterbalance mass formed on the first endplate and positioned in line with the axially extending slot relative to the longitudinal axis.

3. The rotating separator of claim 2, wherein the first counterbalance mass is positioned opposite the longitudinal axis from the axially extending protrusion.

4. The rotating separator of claim 1, wherein the central aperture receives the center tube of the first endplate, the axially extending protrusion formed on the second endplate interior side proximate the perimeter of the central aperture.

5. The rotating separator of claim 4, wherein the second endplate further comprises the first counterbalance mass formed proximate the perimeter of the central aperture.

6. The rotating separator of claim 5, wherein the first counterbalance mass is positioned opposite the longitudinal axis from the axially extending protrusion.

7. The rotating separator of claim 1, wherein the axially extending slot is formed on the center tube of the first endplate and the axially extending protrusion is formed on the second endplate.

8. The rotating separator of claim 4, wherein the first endplate comprises:
a first endplate interior side facing the interior cavity;
a first endplate exterior side facing outside the filter element; and
a planar ring abutting the second endplate interior side in an assembled position, the axially extending slot formed on the planar ring and mating with the axially extending protrusion of the second endplate.

9. A filter element having a longitudinal axis and comprising:
a first endplate including a center tube; and
a second endplate including a central aperture having a perimeter, a second endplate interior side, a second endplate exterior side, and a first counterbalance mass formed on the second endplate exterior side;
an axially extending slot formed on one of the first endplate and the second endplate; and
an axially extending protrusion formed on one of the first endplate and the second endplate, the axially extending protrusion configured to engage with the axially extending slot.

10. The filter element of claim 9, further comprising a second counterbalance mass formed on the first endplate and positioned in line with the axially extending slot relative to the longitudinal axis.

11. The filter element of claim 10 wherein the first counterbalance mass is positioned opposite the longitudinal axis from the axially extending protrusion.

12. The filter element of claim 9, wherein the central aperture receives the center tube of the first endplate, the axially extending protrusion formed on the second endplate interior side proximate the perimeter of the central aperture.

13. The filter element of claim 12, wherein the second endplate further comprises the first counterbalance mass formed proximate the perimeter of the central aperture.

14. The filter element of claim 13, wherein the first counterbalance mass is positioned opposite the longitudinal axis from the axially extending protrusion.

15. The filter element of claim 9, wherein the axially extending slot is formed on the center tube of the first endplate and the axially extending protrusion is formed on the second endplate.

16. The filter element of claim 12, wherein the first endplate comprises:
a first endplate interior side;
a first endplate exterior side; and
a planar ring abutting the second endplate interior side in an assembled position, the axially extending slot formed on the planar ring and mating with the axially extending protrusion of the second endplate.

17. A rotating separator comprising:
a filter element extending axially along a longitudinal axis and comprising:
a first endplate including a first central aperture;
a second endplate coupled to the first endplate forming an interior cavity therein, the second endplate including a second central aperture;
a central hub positioned axially between and coupled to the first endplate and the second endplate, the central hub comprising a center tube extending along the longitudinal axis;
a first axially extending slot formed on one of the first endplate, the second endplate, and the center tube;
a second axially extending slot formed on one of the first endplate, the second endplate, and the center tube;
a first protrusion positioned on and extending along one of an interior side of the first endplate and an interior side of the second endplate and configured to engage with the first axially extending slot;
a second protrusion positioned on and extending along one of the interior side of the first endplate and the interior side of the second endplate and configured to engage with the second axially extending slot; and
a filter structure positioned within the interior cavity and configured to filter a contaminate from a fluid, the filter structure separated from the central tube by the central hub.

18. The rotating separator of claim 17, wherein the first protrusion extends a first distance and the second protrusion extends a second distance;
wherein the filter structure is pre-assembled to the first endplate, and wherein the first distance and the second distance prevent the filter structure from engaging the second endplate until the first protrusion is engaged with the first axially extending slot and the second protrusion is engaged with the second axially extending slot.

19. A rotating separator comprising:
a filter element extending axially along a longitudinal axis and comprising:
  a first endplate including a first central aperture;
  a second endplate coupled to the first endplate forming an interior cavity therein, the second endplate including a second central aperture;
  a central hub positioned axially between and coupled to the first endplate and the second endplate, the central hub comprising a center tube extending along the longitudinal axis;
  a first axially extending slot formed on one of the first endplate, the second endplate, and the center tube;
  a second axially extending slot formed on one of the first endplate, the second endplate, and the center tube;
  a first protrusion positioned on and extending along one of the first endplate, the second endplate, and the center tube and configured to engage with the first axially extending slot;
  a second protrusion positioned on and extending along one of the first endplate, the second endplate, and the center tube and configured to engage with the second axially extending slot; and
  a filter structure positioned within the interior cavity and configured to filter a contaminate from a fluid, the filter structure separated from the central tube by the central hub;
wherein the first axially extending slot is formed on the first endplate, the second axially extending slot is formed on the second endplate, and the first protrusion and the second protrusion are positioned on the center tube, the first axially extending slot and the first protrusion are positioned opposite the longitudinal axis from the second axially extending slot and the second protrusion.

20. A rotating separator comprising:
a filter element extending axially along a longitudinal axis and comprising:
  a first endplate including a first central aperture;
  a second endplate coupled to the first endplate forming an interior cavity therein, the second endplate including a second central aperture;
  a central hub positioned axially between and coupled to the first endplate and the second endplate, the central hub comprising a center tube extending along the longitudinal axis;
  a first axially extending slot formed on one of the first endplate, the second endplate, and the center tube;
  a second axially extending slot formed on one of the first endplate, the second endplate, and the center tube;
  a first protrusion positioned on and extending along one of the first endplate, the second endplate, and the center tube and configured to engage with the first axially extending slot;
  a second protrusion positioned on and extending along one of the first endplate, the second endplate, and the center tube and configured to engage with the second axially extending slot; and
  a filter structure positioned within the interior cavity and configured to filter a contaminate from a fluid, the filter structure separated from the central tube by the central hub;
wherein the first axially extending slot is formed on the first endplate, the second axially extending slot is formed on the second endplate, and the first protrusion and the second protrusion are positioned on the center tube.

21. The rotating separator of claim 20, wherein a first counterbalance mass is positioned on the central hub and opposite the longitudinal axis from the second protrusion and a second counterbalance mass is positioned on the central hub and opposite the longitudinal axis from the first protrusion.

* * * * *